Dec. 31, 1935.  J. WALDHEIM  2,025,796
MEASURING AND DISPENSING DEVICE
Filed Nov. 18, 1929   3 Sheets-Sheet 1
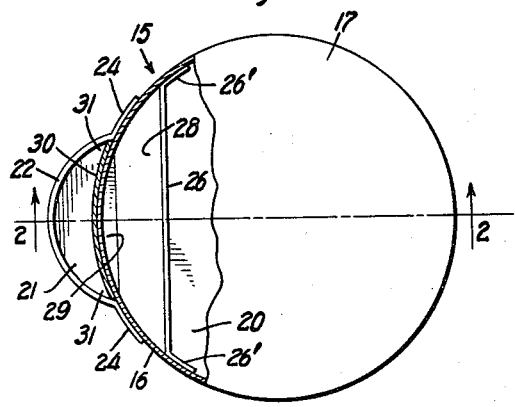
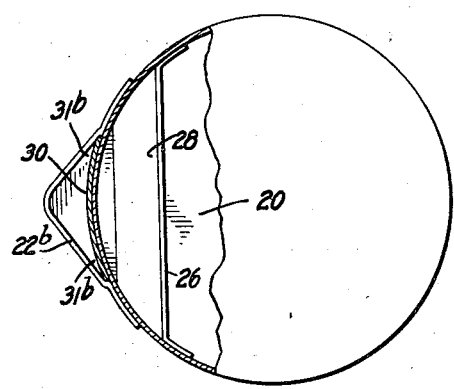
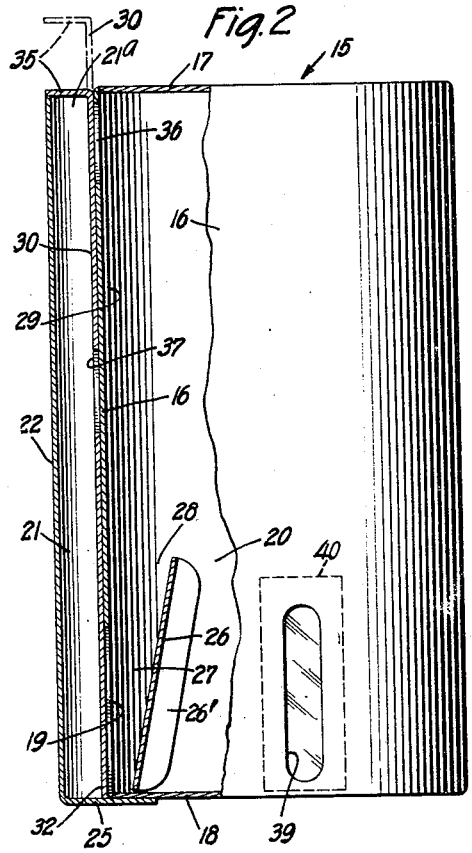
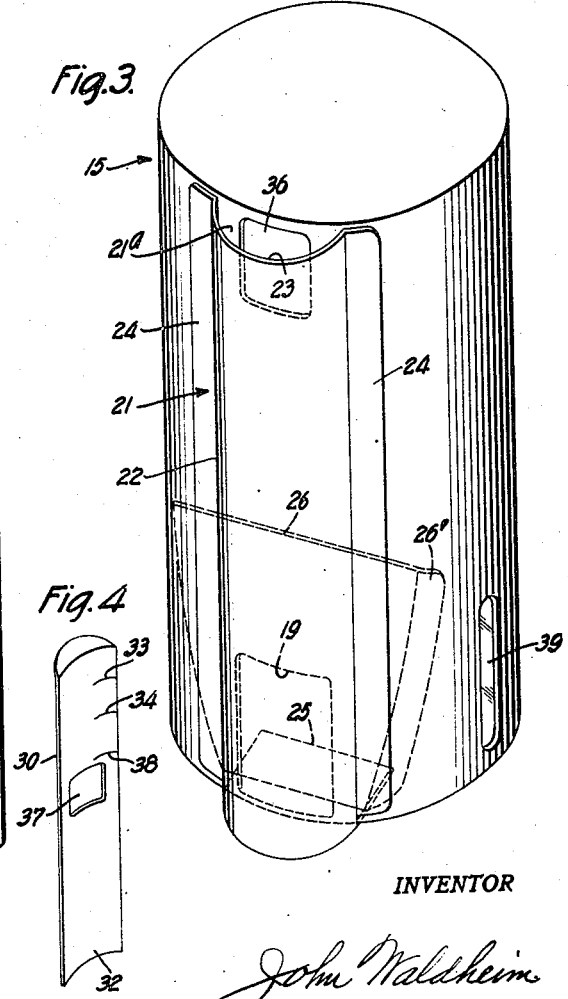
INVENTOR
John Waldheim Dec. 31, 1935.          J. WALDHEIM          2,025,796
MEASURING AND DISPENSING DEVICE
Filed Nov. 18, 1929          3 Sheets-Sheet 2
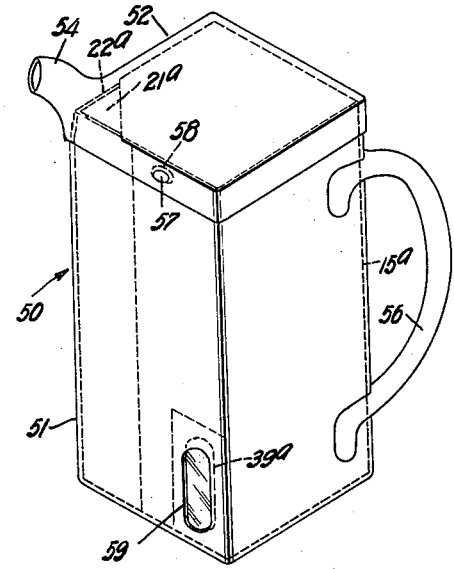
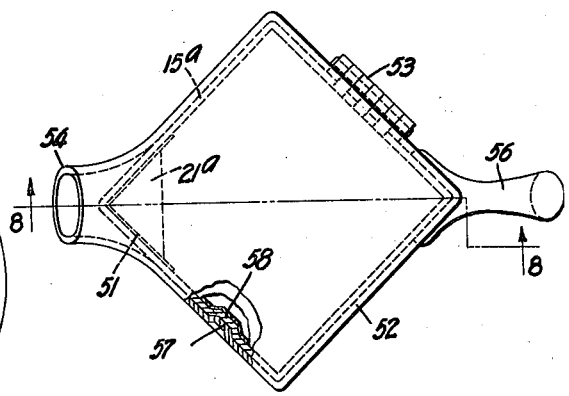
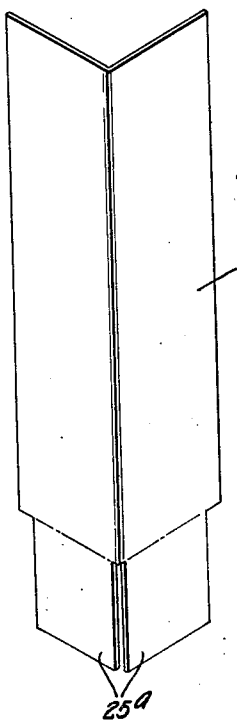
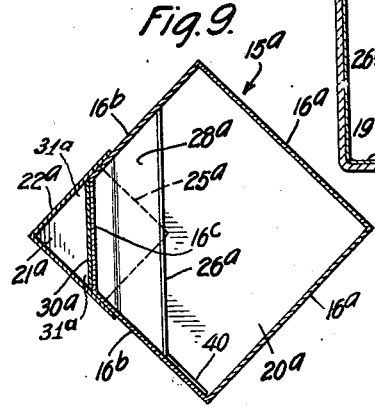
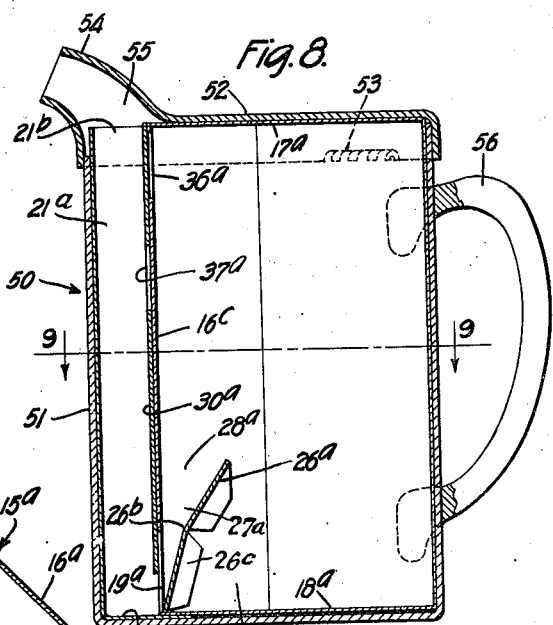
INVENTOR
John Waldheim Dec. 31, 1935.　　　　J. WALDHEIM　　　　2,025,796
MEASURING AND DISPENSING DEVICE
Filed Nov. 18, 1929　　　3 Sheets-Sheet 3
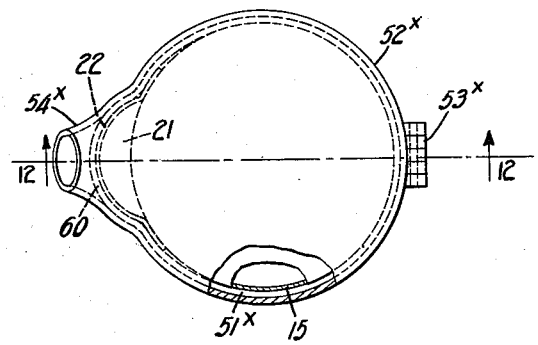
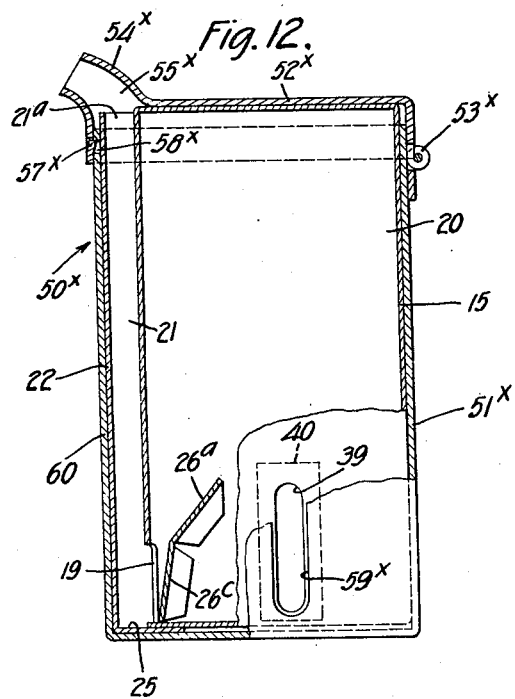
INVENTOR
John Waldheim Patented Dec. 31, 1935

2,025,796

UNITED STATES PATENT OFFICE 2,025,796

MEASURING AND DISPENSING DEVICE

John Waldheim, Elizabeth, N. J.

Application November 18, 1929, Serial No. 407,884

19 Claims. (Cl. 221—98)

This invention relates to measuring and dispensing devices from which predetermined quantities of the material therein, such as sugar, coffee, salt, flour, certain kinds of cereals, baking powder, washing powder, soap chips, etc., may be poured at successive tilting operations of the device.

An object of the invention is to produce a simple paper container which may be used for measuring and dispensing the material in addition to serving as a carton in which the material may be packed to be conveyed from the manufacturer to the consumer.

Another object of the invention is to provide a refill in the form of a combined carton and dispenser which may readily be inserted in an outer ornamental case or holder.

Still another object of the invention is to provide a measuring and dispensing device with means to permit an indefinite quantity of material to be poured therefrom, at will, in a single tilting operation of the device.

Features and advantages of the relative position and arrangement of parts will hereinafter appear.

In the drawings,

Fig. 1 is a top plan view of a cylindrical carton, partly in section;

Fig. 2 is a vertical section taken on the line 2—2 of Fig. 1;

Fig. 3 is a perspective view of the cylindrical carton, its closure device or slide being removed;

Fig. 4 is a perspective view on a smaller scale of the closure device;

Fig. 5 is a top plan view of the carton showing a duct or chute of slightly different shape;

Fig. 6 is a perspective view of a polygonal shaped carton and a case or holder therefor;

Fig. 7 is a top plan view of the device shown in Fig. 6;

Fig. 8 is a vertical section taken on the line 8—8 of Fig. 7;

Fig. 9 is a horizontal section, of the polygonal carton, taken on the line 9—9 of Fig. 8;

Fig. 10 is a perspective view of the strip which assists in forming the duct from which the material is poured;

Fig. 11 is a top plan view of a cylindrical case and shows the cylindrical carton therein; and Fig. 12 is, for the greater part, a vertical section taken on the line 12—12 of Fig. 11, a portion of the view being shown in elevation.

Similar reference characters represent similar parts throughout the several views.

A carton or container 15 comprises a cylindrical wall 16, a top 17 and a bottom 18 suitably secured to the wall 16. The wall 16 has therein an aperture 19 through which the material, such as sugar, in the carton may flow from the storage chamber 20 into the lower end of a duct or chute 21, said duct being formed by a channel-shaped strip 22 extending from the bottom to the top of the carton. The strip 22 is provided with a channel portion 23 having side flaps 24 by which it may be secured to the wall 16 by an adhesive or any other suitable means, if the strip 20 and wall 16 are both composed of cardboard or the like. A bottom flap or member 25 may be folded from the channel portion 23 of said strip to extend under the bottom 18 of the carton 15 and to which it is also secured by adhesive.

The upper end of the duct 21 is open to provide an aperture 21ª through which the measured quantity of material may be poured from said duct when the carton is tilted with its upper end down. It will be understood if the carton is somewhat empty the material in the chamber 20 falls away from the aperture 19, when the carton is tilted, towards the opposite end of the chamber 20, the measured quantity in the duct passing out at the aperture 21ª.

Unless otherwise prevented the material, when the carton is full, continues to pour through the aperture 19, while the carton is in its discharging position, thus delivering more than the measured quantity of material. A baffle plate or guard 26 is, however, provided to prevent a continued flow of material. The guard 26 may be provided with side flaps 26' by which it may be secured to the inside of the wall 16.

It will be observed that the sides of the guard are divergent making said guard tapered and inclined with respect to the floor to thus form with the wall 16 a funnel-like trough or pocket 27 with a comparatively large opening or mouth 28 at its upper end so as to readily receive the material from the chamber 20 while the carton is being returned to its upright position. It will further be observed, due to the curvature of the wall 16, that the size of the mouth of the trough is further increased, and that the curved wall above the trough forms a gutter 29 to guide the material into the trough when the carton is set back to its upright position.

Provision is made to vary the predetermined quantity of material to be poured from the container. To this end there is provided, in the duct 21, a slide 30 engaging in corners 31 formed by the wall 16 and the strip 22, said slide being thus held close to the wall 16. The slide may be set in various positions to locate its bottom edge 22 at various elevations with respect to the aperture 19 and to accordingly control the quantity of material admitted to the bottom of the duct 21; the quantities corresponding, for example, in the use of sugar or the like, to a teaspoon-full and a tablespoon-full.

Indices 33 and 34 may be provided to register with the top of the carton to aid in setting the slide in its various positions.

To manipulate the slide 30 it may be provided with a flap 35 which may also serve as a top closure for the duct 21 when the carton is not in use. The slide serves not only as a means to vary the quantity of material to be dispensed but also as a closure for the aperture 19, when in its lowest position, to prevent the material from filling the duct 21 while the carton is being handled in transit.

To permit an indefinite quantity of material to be poured from the carton at will, the wall 16 may be provided at its upper end with an aperture 36 which is usually closed by the upper end of the slide 30. Said slide is also provided with an aperture 37, which may be registered with the aperture 36 until a mark 38 thereon registers with the top of the carton. Thus upon tilting the carton, when the apertures 36 and 37 are registered, an indefinite quantity of material may be poured through said apertures 36, 37 and through the duct aperture 21ª. The aperture 37 is located intermediate the upper and lower edges of the slide and is positioned with reference to the lower edge so that the aperture 37 does not cooperate with the aperture 36 until the lower edge of the slide moves clear of the lower aperture 19.

When the upper level of the material is nearing the bottom of the container it may be observed through a window 39 in the wall 16; said window being closed by a transparent patch 40 which may be secured to the inner surface of the wall 16.

The duct 21 may be formed by an L-shaped strap 22ᵇ, Fig. 5, to provide corners 31ᵇ in which the slide 30 is guided.

In Figs. 6 to 10, inclusive, there is illustrated a polygonal or square carton 15ª having side walls 16ª and 16ᵇ, a top 17ª and a bottom 18ª suitably secured to said side walls. The carton 15ª also has a short wall 16ᶜ forming a cut-off corner of the carton. An L-shaped strip 22ª is secured to the walls 16ᵇ, at the cut-off corner to form with the short wall a duct 21ª extending up along the carton; the bottom of the duct being formed by turned in flaps 25ª suitably secured to the bottom 18ª of the carton.

The wall 16ᶜ is provided at its lower end with an aperture 19ª through which the material may pass from the chamber 20ª to the duct.

It will be understood that the sides of the strip 22ª may be considered as continuations of the walls 16ᵇ to form a corner, and that the wall 16ᶜ may be considered as a diagonally disposed partition located in the corner of the carton to form the simple discharge duct 21ª.

A tapered partition 26ª is diagonally disposed between the side walls 16ᵇ and is located at the aperture 19ª to form a funnel-like pocket or trough 27ª to receive the material from the storage chamber; said partition being inclined to effectively guide the material into the bottom of the chute 21ª. The partition 26ª may be bent at 26ᵇ to provide a large mouth 28ª at the upper end of the pocket to catch the material more effectively when the carton is turned back to its upright position.

It may be desirable that the section 26ᶜ below the bend 26ᵇ of the partition 26ª be disposed at a steep angle so as to be as close as possible to the wall 16ª and thus keep at a minimum the quantity of material passing from the pocket into the duct when the carton is tilted.

A settable slide 30ª is guided in corners 31ª of the duct 21ª, and determines the quantity of material to be dispensed at each tilting of the carton. The wall 16ᶜ and the slide 30ª are provided with apertures 36ª and 37ª, respectively, which, when brought into registration, permit an indefinite, or, in other words entire quantity of material to be poured from the carton through the aperture at the upper end of the duct 21ª.

It will be understood that the carton may be constructed for domestic use, or for restaurant use. When constructed for domestic use it includes the slide provided with the indices to set it according to varying quantities of material desired, and the slide aperture 37ª and aperture 36ª may also be provided so that indefinite quantities of material may be poured from the carton.

When the carton is constructed for use on tables in a restaurant to dispense sugar, the slide may be modified to serve only as a closure for the carton during shipment, and when the carton is put into use in the restaurant the slide may be permanently removed from the carton; the aperture at the bottom of the duct being made just large enough to measure out a teaspoon-full of sugar at each tilting of the carton; the aperture at the top of the carton wall being omitted.

It will be understood that the carton intended for domestic use may also be used in restaurants in which case the slide may be set to dispense a teaspoon-full of sugar at a time, and the portion of the slide protruding from the carton may then be torn off so as to prevent further manipulation of said slide. If desired the slide may be previously weakened at the tearing-off place.

It will be understood that some of the parts of the cartons, above described, may be composed of thin sheet metal, while others may be composed of card-board. For example, the strip forming the delivery duct may be of metal provided with prongs, and the body may be composed of cardboard to which the duct strip may be attached by said prongs.

It will further be understood that the cartons may, if desired, be composed completely of thin sheet metal instead of card-board, in which case the various parts of the carton may be secured to each other by soldering, riveting, welding, or in any other suitable manner.

It may be objectionable to place the carton on tables in high class restaurants and I therefor provide a holder 50, which may be ornamental and into which the carton may readily be placed and from which the empty carton may be removed to be substituted by a full one. The holder may include a body 51 to receive the carton, and a cover 52 which may be connected to the body by a hinge 53.

The holder is provided with a spout 54 which is herein illustrated as forming part of the cover. When the cover is in its closed position the spout aperture 55 registers with the aperture 21ᵇ at the upper end of the duct 21ª so that upon tilting the holder with the spout downward, by a handle 56, the measured quantity of sugar passes from the duct 21ª through the spout 54.

The carton may fit snugly in the body part of the holder 50 to be held frictionally therein. The cover 52 may be held closed by a raised portion 57 on the inside of the cover which springs into a depression 58 formed on the body part 51 of the holder. The body part 51 may be slightly shorter than the carton so that said carton protrudes sufficiently to be readily grasped for removal from the holder. An aperture 59 is provided in the wall of the body part 51 to register with the window 39a of the carton. Due to the similarity of the non-cylindrical shape of the holder and carton the aperture in the duct of the carton is caused to register with the spout of said holder, and the carton is kept from turning in the holder.

It will be understood that the holder 51x, Figs. 11 and 12, may be partly cylindrical to receive the partly cylindrical carton 15. In this form of the invention the holder 51x, may be provided with a channel 60 in its wall into which the duct 21 of said carton fits, thus providing a means to insure registration of the duct aperture with the spout of the holder and also prevent turning of the carton in the holder about its axis.

The parts of the holder 51x, shown in Figs. 11 and 12, which are similar to those of Fig. 8, have been given the same reference characters with the addition of the superscript x.

While certain preferred embodiments of the invention have been shown and described, it will be understood that changes in the form, arrangements, proportions, sizes and details thereof may be made without departing from the scope of the invention as defined in the appended claims.

I claim:—

1. In a dispenser having an aperture, the combination of means whereby predetermined, limited quantities of material may be poured from the container at successive tilting operations of the container, a device settable on said dispenser relatively to said aperture to vary the quantities of material, said dispenser having another aperture at its discharge end, said device having an aperture, means permitting said device to be set to another position on the dispenser and without removing it from the dispenser to register the device aperture with the second mentioned aperture of the dispenser to uncover said second mentioned aperture so that an indefinite quantity of the material may be poured from the container at a single tilting operation of the container.

2. A carton including means to dispense predetermined quantities of material at successive tilting operations, said means including a chute at the side of the carton, said chute having a delivery aperture at its upper end, and an outer case into which the carton may be inserted, said case having an aperture at the one side of its upper end which is located at and registers with the aperture in the chute.

3. A carton including means to dispense predetermined quantities of material at successive tilting operations, said carton having a delivery aperture at the top thereof, an outer case into which the carton may be inserted, a cover at the top of the case and closing the latter, and a spout on the cover to register with the aperture in the carton through which spout the material may be poured directly from the delivery aperture.

4. A carton including means to dispense predetermined quantities of material at successive tiltings, and a window in the wall of the carton extending down to the bottom of the carton so that the level of the material may be observed when the carton is nearly empty, a holder for said carton through which the material may be poured from said carton, and a window in said holder to register with the other window.

5. A dispenser including a storage chamber, a delivery duct having an aperture, a partition section at the aperture to form a pocket to receive the material from the storage chamber and to deliver it through said aperture into said duct, and a partition section angularly disposed to and extending upwardly from the upper end of the first mentioned section to form a wide mouth at the upper end to readily catch the material and to extend close to said aperture at the other end.

6. The combination of a container, a case into which it may be placed, said container having an aperture at one side of its upper end from which material therein may be poured, said case including a spout at one side of its upper end, and means whereby the container may be located about the axis of the case to register said aperture with the spout so that the material may be poured directly from the aperture through the spout.

7. The combination of a carton including a supply chamber, means at one side of the carton for measuring equal quantities of material at successive dumpings thereof, said carton including also a delivery duct at one side thereof and associated with the measuring means, and an outer case to contain the carton, said case including a spout through which the material may be poured from the duct, said spout being located in such a position on the case with respect to the carton as to cause the material in the supply chamber to flow towards the measuring means during part of the pouring operation.

8. A measuring and dispensing device including a storage chamber, a duct extending upwardly from the lower end of said chamber, said duct having a discharge opening at its upper end, there being an aperture at the lower end of the chamber through which a limited quantity of material may pass from the storage chamber into the duct, and a guard at said aperture, said guard being bent so that the lower portion extends upwardly from the floor of the storage chamber and close to said aperture, and the upper portion forming a large mouth at the upper end of said guard.

9. In a dispensing device having a plurality of walls including a narrow one to form a storage chamber, a duct member forming with the narrow wall a triangular duct on the outside of the storage chamber, there being an aperture at the bottom of said narrow wall through which the material may pass from the chamber to the duct, a slide guided in the corners of said duct and adapted to engage the floor of the dispensing device to close said aperture, said guide being adjustable to vary the size of the aperture in accordance with the quantity of material to be poured from the container, and a guard located at said aperture, said guard extending from the floor of the dispenser to a position above the upper end of said aperture and being located at the inner side of the narrow wall and out of the path of the slide so as not to be engaged by said slide while the latter is in the position to close the aperture.

10. The combination of a dispenser having a polygonal shape as seen from the top, said dispenser having a pre-formed discharge aperture at the top thereof, and a holder for said dispenser, said holder having an aperture at its upper end, the dispenser fitting into the holder, the shapes of the dispenser and holder assisting to positively locate them about their axes with respect to each other, while the dispenser is being inserted into the holder, so as to assist in registering the apertures with each other in order that the material may be poured through both apertures simultaneously.

11. The combination of a container which is rectangular provided with means for dispensing predetermined quantities of material at successive tilting operations, said container being provided also at one of its corners with a discharge passage, the discharge passage having its mouth in the upper face of the container, a rectangular holder in which the container is replaceably supported, a cover to close the top of the holder, and a spout on the cover and located in one corner thereof to set over the mouth of the discharge passage so that the material may be poured directly from the discharge passage through the spout.

12. In a dispenser, the combination of a supply chamber for dispensible material, a delivery duct extending upwardly at one end of the supply chamber, the latter having two apertures, one at its upper end and one at its lower end, both apertures opening into the duct, and a slide in said duct, the lower end of said slide cooperating with the lower aperture to vary the size of the passage from said chamber to said duct to measure and discharge equal quantities of the material at successive tilting operations of the dispenser, the upper end of said slide serving as a closure for the upper aperture, said slide having an aperture intermediate its upper and lower ends which may be registered with the upper aperture to permit an unmeasured quantity of the material to be poured from the dispenser at a single tilting operation without removing the slide from the dispenser, the aperture on the slide being located with reference to the lower end of the latter so that the slide aperture cooperates with said upper aperture immediately after the lower end of said slide is moved out of cooperative relation with said lower aperture so as to keep at a minimum the distance which the slide extends from the dispenser.

13. In a dispenser, the combination of a supply chamber having a floor, a delivery duct attached to and extending upwardly on the outside of the supply chamber, said duct having a floor independent of the chamber floor, said supply chamber having an aperture opening into the delivery duct, and a substantially flat guard located inside of said chamber and at said aperture, said guard extending upwardly in an inclined position throughout its length in said supply chamber, said guard having a straight upper edge and diverging side edges the latter to fit against the inner side of the supply chamber to form therewith a funnel like pocket.

14. In a dispenser, the combination of a supply chamber, an element secured to the outside of said chamber to form a discharge duct, said chamber having an aperture opening into said duct, and a member on said element and independent of the floor of said chamber to form a closure for the lower end of said duct, the lower end of said duct forming with said aperture means for measuring quantities of material.

15. In a dispenser, the combination of an outer case, an inner case holding the material, a duct extending upwardly at one side of the dispenser, the inner case having an aperture at one side of its lower end and opening into said duct, said aperture forming with the lower end of said duct a measuring device, a discharge aperture at the upper end of the duct, and a cover on the outer case to permit the insertion of the inner case and to hold the latter in the outer case.

16. In a dispenser, the combination of two elements namely a case, and a container in said case and detachably mounted therein, a discharge opening at one side of the case, said container having an aperture in one side thereof from which the content of the container may be poured directly through the case opening, means including a projection on one of said elements to engage in a groove of the other element to locate the container in the case about the axis thereof to register the aperture with said discharge opening, and a cover on the case to permit the insertion of said container.

17. The combination of a dispenser including a cylindrical storage chamber, and a duct at one side thereof, the storage chamber having an aperture in one side thereof and opening into one end of said duct to form with said end a measuring device, a holder having a major cylindrical portion and a channel at one side thereof, the storage chamber fitting into the major portion of the holder and the duct being located in said channel, the duct and the holder having each an aperture at one end thereof, the duct and the channel being effective to register said apertures with each other and to retain them in registration.

18. In a dispenser, the combination of a container having an aperture therein, an element on the outside of said container to form therewith a discharge duct, and a member on said element and independent of the floor of the container to form a closure at the lower end of said duct, said duct being located at said aperture and forming therewith means for measuring quantities of material.

19. In a dispenser, the combination of a container having an aperture therein, an element on the outside of said container to form therewith a discharge duct, a member on said element and independent of the floor of the container to form a closure for said duct, said duct being located at said aperture and forming therewith means for measuring quantities of material, and a settable slide in said duct to vary the size of the aperture to accordingly vary the quantity of material measured.

JOHN WALDHEIM.